United States Patent
Ben-Yaakov et al.

(10) Patent No.: US 6,728,121 B2
(45) Date of Patent: Apr. 27, 2004

(54) METHOD AND APPARATUS FOR ACTIVE POWER FACTOR CORRECTION WITH MINIMUM INPUT CURRENT DISTORTION

(75) Inventors: Shmuel Ben-Yaakov, Beer Sheva (IL); Ilya Zeltser, Beer Sheva (IL)

(73) Assignee: Green Power Technologies Ltd., Rehovot (IL)

(*) Notice: Subject to any disclaimer, the term of this patent is extended or adjusted under 35 U.S.C. 154(b) by 0 days.

(21) Appl. No.: 10/158,588

(22) Filed: May 31, 2002

(65) Prior Publication Data

US 2003/0223255 A1 Dec. 4, 2003

(51) Int. Cl.$^7$ ................................. G05F 1/70
(52) U.S. Cl. ........................ 363/89; 323/207
(58) Field of Search ............... 323/207; 363/89

(56) References Cited

U.S. PATENT DOCUMENTS

| | | | | |
|---|---|---|---|---|
| 5,134,355 A | * | 7/1992 | Hastings | 323/211 |
| 5,278,490 A | | 1/1994 | Smedley | 323/284 |
| 5,570,276 A | | 10/1996 | Cuk et al. | 363/16 |
| 5,612,609 A | * | 3/1997 | Choi | 363/89 |
| 5,687,070 A | * | 11/1997 | Jacobs et al. | 363/89 |
| 5,742,151 A | | 4/1998 | Hwang | 322/222 |
| 5,886,586 A | | 3/1999 | Lai et al. | 332/109 |
| 5,920,471 A | * | 7/1999 | Rajagopalan et al. | 363/89 |
| 6,031,299 A | * | 2/2000 | Stumfall et al. | 323/207 |
| 6,034,513 A | * | 3/2000 | Farrington et al. | 323/222 |
| 6,259,614 B1 | * | 7/2001 | Ribarich et al. | 363/89 |
| 6,388,429 B1 | * | 5/2002 | Mao | 363/89 |
| 6,445,600 B2 | * | 9/2002 | Ben-Yaakov | 363/89 |
| 6,469,917 B1 | * | 10/2002 | Ben-Yaakov | 363/89 |

OTHER PUBLICATIONS

International Electrotechnical Commission (IEC), "International Standard 1000–3–2," pp. 1–47, Mar. 1995.

S. Ben Yaakov and I. Zeltser, "PWM Converters with Resistive Input", IEEE Trans. Industrial Electr., vol. 45 (3), pp. 519–520, Jun. 1998.

S. Ben Yaakov and I. Zeltser, "PWM Converters with Resistive Input",PCIM–98, Dec. 1998.

H. Levy, I. Zafrany, G. Ivensky, and S. Ben–Yaakov, "Analysis and evaluation of a lossless turn on snubber", IEEE Applied Power Electronics Conference, APEC–97, 757–763, Atlanta, Feb. 1997.

R. Mamano, "New developments in high power factor circuit topologies," HPFC Record, pp. 63–74, Dec. 1996.

New universal control methods for power factor correction and DC to DC Converter Applications, Hwang et al; IEEE Feb. 1997.

* cited by examiner

*Primary Examiner*—Jeffrey Sterrett
(74) *Attorney, Agent, or Firm*—Mark M. Friedman

(57) ABSTRACT

A method for reducing the harmonics contents of an input current drawn from a power line into an electrical system without sensing an input voltage, the method comprising providing an active power factor correction controller with a switch module having a main switch and a timing device, wherein the main switch has an on-time correlated with an on-duty cycle duration, and an off-time correlated with an off-duty cycle duration, and maintaining a linear relationship between the off-duty cycle duration and the input current by using the timing device; and an apparatus for active power factor correction with minimum input current distortion, comprising an active power factor correction assembly that includes a main switch and a timing device, wherein the main switch has associated therewith an on-time correlated with an on-duty cycle duration, and an off-time correlated with an off-duty cycle duration, and wherein the timing device generates the mentioned on-time and off-time, and linearization means for maintaining a linear relation between the off-duty cycle duration and the input current.

9 Claims, 11 Drawing Sheets

METHOD AND APPARATUS FOR ACTIVE POWER FACTOR CORRECTION WITH MINIMUM INPUT CURRENT DISTORTION

FIELD AND BACKGROUND OF THE INVENTION

The present invention relates to control method and apparatus of modular design for regulating the harmonics contents of the current drawn from the power line by electrical equipment and loads, and in particular to the electronic circuit design, physical construction and layout of such an apparatus.

Switch Mode and Resonant Converters are widely used for DC-DC, DC-AC, AC-DC and AC-AC conversion. In some groups of applications, the purpose of the power conversion scheme is to shape the input current seen at the input of the converter. For example, in an input power stage known in the art as an Active Power Factor Correction (APFC) circuit, the function of the converter is to ensure that the AC current seen by the power line is in phase with the line voltage with minimum high order harmonics. A typical well-known embodiment of APFC is shown in FIG. 1. In this method, the input voltage is rectified by a diode bridge $D'_1$ and fed to a Boost stage that comprises an input inductor $L'_{in}$, a power switch $S'_1$, a high frequency rectifier $D'_2$, an output filter capacitor $C'_O$ and a load $R'_L$. Power switch $S'_1$ is driven by a high frequency control signal of duty cycle $D_{ON}$ such as to force an input current $i_{ina}$ to follow the shape of a rectified input voltage $v_{inR}$. Consequently, the input terminal will look resistive i.e. the Power Factor (PF) will be unity.

The need for APFC stages is driven by the worldwide concern for the quality of the power line supplies. Injection of high harmonics into the power line and poor power factor in general, is known to cause many problems. Among these are the lower efficiency of power transmission, possible interference to other units connected to the power line, and distortion of the line voltage shape that is undesirable. In the light of the practical importance of APFC many countries have adopted, or are in the process of adopting, voluntary and mandatory standard. These norms set limits to the permissible current line harmonics injected by any given equipment that is powered by the mains so as to maintain a high power-quality [International Electrotechnical Commission (IEC), "International Standard 1000-3-2," pp. 1–47, 1995].

Another advantage of APFC is the increase in the power level than can be drawn from a given power line. Without Power Factor Correction, the rms current will be higher than the magnitude of the first harmonics of the current, the latter being the only component that contributes to real load power. However, protection elements such as fuses and circuit breakers respond to the rms current. Consequently, the rms current will limit the maximum power that can be drawn from the line. In Power Factor Corrected equipment the rms current equals the magnitude of the first harmonics of the current (since the higher harmonics are absent) and hence the power drawn from the line could reach the maximum theoretical value. It is thus evident that the need for APFC circuits is wide spread, and that the economics of the realization is of prime importance. Cost is of great concern considering the fact that the APFC is an add-on expense to the functionality of the original equipment in which the APFC stage is included. In the light of the above, physical construction methods of APFC that are economical to produce and can be easily integrate in any given equipment are highly desirable and advantageous.

FIG. 2 illustrates the conventional embodiment of a APFC system [R. Mamano, "New developments in high power factor circuit topologies," *HPFC Record, pp.* 63–74, 1996.]. An APF CONTROLLER receives the shape of a rectified power line voltage $V_{ac\_ref}$ obtained via a divider 110 comprised of resistors $R'_a$ and $R'_b$ from an input voltage $V_{inR}$, which shape is used as the reference for the desired shape of the input current. The controller also receives a voltage $v_{iin}$ across a resistor $R'_s$, the voltage $V_{iin}$ being identical to the input current when the power switch is on, and generates gate pulses $D_{ON}$ to a power switch $Q'_1$ such as to force the inductor current to follow the reference. The current level is adjusted for any given load $R'_L$ by monitoring output voltage $V_O$ via a divider 120 comprised of resistors $R'_1$ and $R'_2$, and by multiplying the reference signal $V_{ac\_ref}$ by the deviation from the desired output voltage level, so as to trim the effective reference signal to the load.

A major drawback of the prior art implementation of the APFC is the need for sensing the input voltage $V_{inR}$, namely the line voltage after rectification. Due to the switching effects, the input voltage is normally noisy and is susceptible to interference pick-up that may distort the reference signal and hence the input current. Furthermore, the extra pin required for input voltage sensing will increase the number of pins of a modular device built in the conventional APFC scheme.

PFC controllers that do not require the sensing of the input voltage have been described in the past. (S. Ben Yaakov and I. Zeltser, "PWM Converters with Resistive Input", IEEE Trans. Industrial Electr., Vol. 45 (3), pp. 519–520, 1998; S. Ben Yaakov and I. Zeltser, "PWM Converters with Resistive Input",PCIM-98, pp. 87–95, Nuremberg, 1998; U.S. Pat. No. 5,742,151 to Hwang; and U.S. Pat. No. 6,034,513 to Ferrington). However, prior art methods that do not sense the input voltage suffer from a number of drawbacks that deteriorate their performance, in particular resulting in a higher Total Harmonic Distortion (THD). Furthermore, these prior art methods do not include means to ensure soft switching of the main switch. This deficiency is a major drawback in high power applications, where the reverse recovery current of the main diode may cause substantial power losses and high stresses on the main diode and switch. These drawbacks are next discussed in connection with the circuit described in S. Ben Yaakov and I. Zeltser, PCIM-98, but they apply in whole or part to other prior art embodiments of APFC systems that do not employ input voltage sensing.

The operation of the controller described in S. Ben Yaakov and I. Zeltser, PCIM-98, hinges on some basic theoretical considerations to be detailed first. Consider the Boost stage of FIG. 1. The voltage seen at point 'a' is a pulsating voltage of maximum amplitude $V_o$ and duration of $t_{off}$ (when $S'_1$ is not conducting). Consequently, the average voltage $v_{av}$ at point 'a' will be:

$$v_{av} = \frac{V_o t_{off}}{t_S} \quad (1)$$

where $t_S$ is the PWM switching period.
Or:

$$v_{av} = V_o D_{OFF} \quad (2)$$

where $$D_{OFF} = \frac{t_{off}}{t_s} \quad (3)$$

The 'on' duty cycle $D_{ON}$, when $S'_1$ is conducting (During $t_{on}$) is similarly defined as:

$$D_{ON} = \frac{t_{on}}{t_s} \quad (4)$$

The input voltage fed to the Boost converter, is assumed to be of low frequency as compared to the switching frequency ($f_s=1/t_s$) and hence can be considered constant over one or several switching periods ($t_s$). Assuming that the power stage is properly controlled, the average low frequency voltage across $L'_{in}$, will be close to zero (otherwise the current will increase to very high values). This implies:

$$v_{inR} = v_{av} \quad (5)$$

or from (1)

$$v_{inR} = V_o D_{OFF} \quad (6)$$

If $D_{OFF}$ is programmed according to the rule:

$$D_{OFF} = K i_{ina} \quad (7)$$

where K is a constant and $i_{ina}$ is the low frequency component of the input current ($i_{in}$), then:

$$v_{inR} = V_o K i_{ina} \quad (8)$$

or:

$$i_{ina} = \frac{v_{inR}}{V_o K} \quad (9)$$

Assuming now that $C'_O$ is sufficiently large so that the ripple of $V_o$ can be neglected one sees that, according to eq. (8), the input current will follow the input voltage. That is, the converter stage will look resistive with an apparent input resistance $R_e$:

$$R_e = K V_o \quad (10)$$

The value of the input resistance and hence the input current can thus be controlled by varying K. In practical applications, $V_o$ needs to be maintained constant even if the load ($R'_L$) varies. In this control scheme, the output voltage can be maintained constant by closing a feedback loop on K. This is shown conceptually in FIG. 3. Here, the voltage that is proportional to $v_{in}$ is multiplied in a multiplier (M) by the output $V_e$ of an error amplifier $AMP_1'$ that compares $V_o$ to a reference voltage $V_{ref}$. The product, which is proportional to $i_{ina}$ by a given factor K is fed to a PWM modulator to generate $D_{OFF}$ according to eq. (7).

As known in the art, e.g. in S. Ben Yaakov and I. Zeltser, PCIM-98, a PWM modulator that is based on a controller having a ramp with a variable slope can replace the function of multiplier (M) in FIG. 3. The basic configuration of a PWM modulator that is based on a controller having a ramp with a variable slope is shown in FIG. 4. It includes a ramp generator built around a capacitor Cramp, a current dependent source $G_1$ and a discharge switch $S_{ds}$. The controller also includes a comparator $COMP_1$ that is used as a PWM modulator. $COMP_1$ actually generates a PWM signal. The output of comparator $COMP_1$ is fed via a proper driver to the control terminal of the main switch of the power stage (power switch $S'_1$ in FIG. 1). The basic switching cycle ($t_s$), see also FIG. 5, is controlled by a CLOCK that produces sharp pulses that are used to discharge ramp capacitor Cramp. The slope of the ramp ("SLOPE") is governed by the output current ($I_G$) of current source $G_1$. Hence SLOPE will be:

$$SLOPE = \frac{I_G}{C_{ramp}} \quad (11)$$

A voltage proportional to the input current ($v_{iin} = K_i i_{ina}$) (where $K_1$ is actually the resistance of $R'_s$) is compared to the ramp voltage at the input of comparator $COMP_1$ to produce $t_{off}$ such that:

$$t_{off} SLOPE = v_{iin} \quad (12)$$

Consequently:

$$t_{off} = \frac{v_{iin}}{SLOPE} \quad (13)$$

Or:

$$t_{off} = K i_{ina} \quad (14)$$

where:

$$K = \frac{K_i C_{ramp}}{I_G} \quad (15)$$

It is thus evident that the basic circuit of FIG. 4 implements the control rule of eq. (7) and thus causes the input terminals of the Boost converter (FIG. 1) to look resistive. Furthermore, the implementation of FIG. 4 will also automatically maintain a constant output voltage as needed in many applications. This is accomplished by making the dependent current source a function of the difference between reference voltage $V_{ref}$ and output voltage $V_o$ (FIG. 4). This is similar to amplifier $AMP_1'$ of FIG. 3, except that $G_1$ is now a transconductance amplifier, namely that its output is a current that is proportional to the voltage at its input terminals. Consequently, when there is a tendency for an output voltage change, say a decrease due to an increase in load current, the magnitude of $I_G$ will increase in such a way as to make K smaller and hence $i_{in}$ larger. This is next discussed in detail by considering the curves of FIG. 5.

Consider a case in which the steady state conditions correspond to some input current $i_{ina1}$ (that is translated to a proportional voltage $v_{iin1}$). The respective steady state duty cycle is $D_{ON1}$. Now suppose there is an increase in load current which results in a lower $V_O$. The tranconductance amplifier ($G_1$, FIG. 4) will react and its output current ($I_G$) will increase. This will cause the voltage slope across Cramp to increase from an initial ramp value of $SLOPE_1$ to a steeper value of $SLOPE_2$ (FIG. 5). As a result the "on" part of the switching duty cycle will change from the initial value of $t_{on1}$ to a new, larger value $t_{on2}$. As known in the art, this will increase the input current. Eventually, the system will settle at a new operating point with a higher input current ($v_{iin2}$) corresponding to the higher power demand, but with the same "on" duty cycle ($t_{on1}$), which is a function of the steady state voltage ratio.

As pointed out above, the prior art realization of APFC systems with no sensing of input voltage suffer from a number of drawbacks that lead to inferior performance. These major deficiencies are discussed below.

A major problem that causes an increase in the undesired input current harmonics, is the modulation of the duty cycle by the ripple of the output voltage. Since the output voltage includes a ripple component, the current $I_G$ (FIG. 4) will include a ripple component as well. This will cause a distortion on the input current $i_{ina}$. The problem could be amended to some extent by slowing down the response of $G_1$ so as to attenuate the ripple component. However this will result in large undesired overshoots and undershoots in the output voltage in response to load changes.

Another drawback of the prior art solutions is the distortion of the input current due to errors in the realization of the basic relationship given by eq. (7). For example, assume that the ramp voltage on Cramp (FIG. 4) is as shown by trace 200 in FIG. 6, resulting from the charging current $I_G$ and the discharge pulse $V_{dis}$ 202 (FIG. 6) fed to $S_{ds}$ (FIG. 4). Consequently, the effective off-time $t_{off}$ generated by the circuit (and fed to the main switch) will be composed of the time segments $t_0$–$t_4$ $$t_{off}(t_1-t_0)+(t_4-t_3)+(t_s-t_4) \quad (16)$$

Or:

$$t_{off} = \frac{v_{iin}}{S_1} + \frac{v_{iin}}{S_2} + (t_s - t_4) \quad (17)$$

Since $v_{iin}=K_{in} i_{ina}$ we find $$D_{OFF} = \frac{K_{in} i_{ina}}{t_s}\left(\frac{1}{S_1} + \frac{1}{S_2}\right) + \frac{(t_s - t_4)}{t_s} \quad (18)$$

That is, the actual $t_{off}$ will deviate from the theoretical relationship (eq. 7) due to the last term in eq. (18). This will introduce distortion to the input current $i_{ina}$.

Another drawback of the prior art solutions using APFC systems without input voltage sensing is the hard switching of the main switch at "turn-on". During turn-on, main switch $Q'_1$ has to absorb the very high reverse recovery current of main diode $D'_2$ (FIG. 3). Considering the high output voltage of the APFC power stage, the peak reverse current could be very high, stressing both the switch and the diode.

The above examples show that the prior art solutions to an APFC stage that does not require the sensing of the input voltage have considerable practical drawbacks.

There is thus a widely recognized need for, and it would be highly advantageous to have, APFC units, which does not require the sensing of the input voltage but does have a low input current distortion. It will be further highly desirable that the circuit will reduce the stresses due to the reverse recovery process of the main diode. Also, it would be highly advantageous to have an APFC unit of modular construction, that is also compatible with microelectronics technology. These goals are met by present invention.

SUMMARY OF THE INVENTION

The present invention discloses an innovative method for realizing an Active Power Factor Correction (APFC) stage that reduces line distortion by: (a) making $t_{off}$ meet accurately equation (7); (b) reducing the effect of the output ripple; and (c) eliminating the harmful effects of the reverse recovery of the main diode.

An important feature of the method is the lack of a sense line to the input voltage of the APFC stage. This makes the stage less sensitive to noise and facilitates a modular construction of the electronics in either monolithic or discrete implementation. These features reduce the cost of APFC stages built according to this invention and improving their performance.

According to the present invention there is provided a method for reducing the harmonics contents of an input current drawn from a power line into an electrical system without sensing an input voltage, the method comprising: providing an active power factor correction controller with a switch module having a main switch and a timing device, wherein the main switch has an on-time correlated with an on-duty cycle duration, and an off-time correlated with an off-duty cycle duration, and maintaining a linear relationship between the off-duty cycle duration and the input current by using the timing device.

According to the present invention there is provided an apparatus for active power factor correction with minimum input current distortion, comprising: an active power factor correction assembly that includes a main switch and a timing device, wherein the main switch has associated therewith an on-time correlated with an on-duty cycle duration, and an off-time correlated with an off-duty cycle duration, and wherein the timing device generates the mentioned on-time and off-time, and linearization means for maintaining a linear relation between the off-duty cycle duration and the input current.

A main innovative feature of the method according to the present invention is the application of control methods that lower the number of interconnections, and the combining of the switch and associated control circuitry in one module. These enable the construction of a complete APFC stage from five basic and independent elements: the input rectifier, inductor, switch module, output diode and output capacitor. Alternatively, by including the diode within the main switch assembly, the number of components for a complete system is reduced to four. Since no back interconnection is required, the power flow is simple, causing minimum interference to other parts of the equipment. At the same time, the streamlined construction minimizes the susceptibility of the circuit to switching noises and hence improved the stability and reliability of the circuit. An important feature of the method according to this invention is its compatibility with microelectronics technology. In particular, the switch and control module, with or without the output diode, can be produced by conventional Silicon based IC technology, making this sub-assembly a relatively low cost component. The invention also provides a cost effective solution to the problem of generating efficiently a local supply voltage needed to power the internal circuitry of the switch module. This is of particular importance in high power level applications in which the local power supply needs to sustain relatively high currents.

Therefore, according to the present invention there is provided a method for optimizing the design of APFC stages in the sense that the APFC can be assembled from basic building blocks that are easy to mount, have high reliability, potentially lower cost and highly compatible with common heat removal methods such as heat sinks and fan cooling.

The control strategy and constructional method according to this invention thereby overcome the shortcoming of existing design and control methods which include many interconnected components, signal differentiating or a costly single module with poor heat management capabilities.

DETAILED DESCRIPTION OF THE PREFERRED EMBODIMENTS

The present invention is of a method and apparatus for Active Power Factor Correction (APFC) with minimum input current distortion. Specifically, the present invention is of an innovative method for realizing an APFC stage that reduces line distortion by: (a) making $t_{off}$ meet accurately eq. (7); (b) reducing the effect of the output ripple; and (c) eliminating the harmful effects of the reverse recovery of the main diode. A substantial improvement in construction of APFC stages is obtained by applying the modified control strategy of this invention, a strategy that does not require the sensing of an input voltage.

The principles and operation of the method and apparatus for active power factor correction with minimum input current distortion according to the present invention may be better understood with reference to the drawings and the accompanying description.

Figure 7:
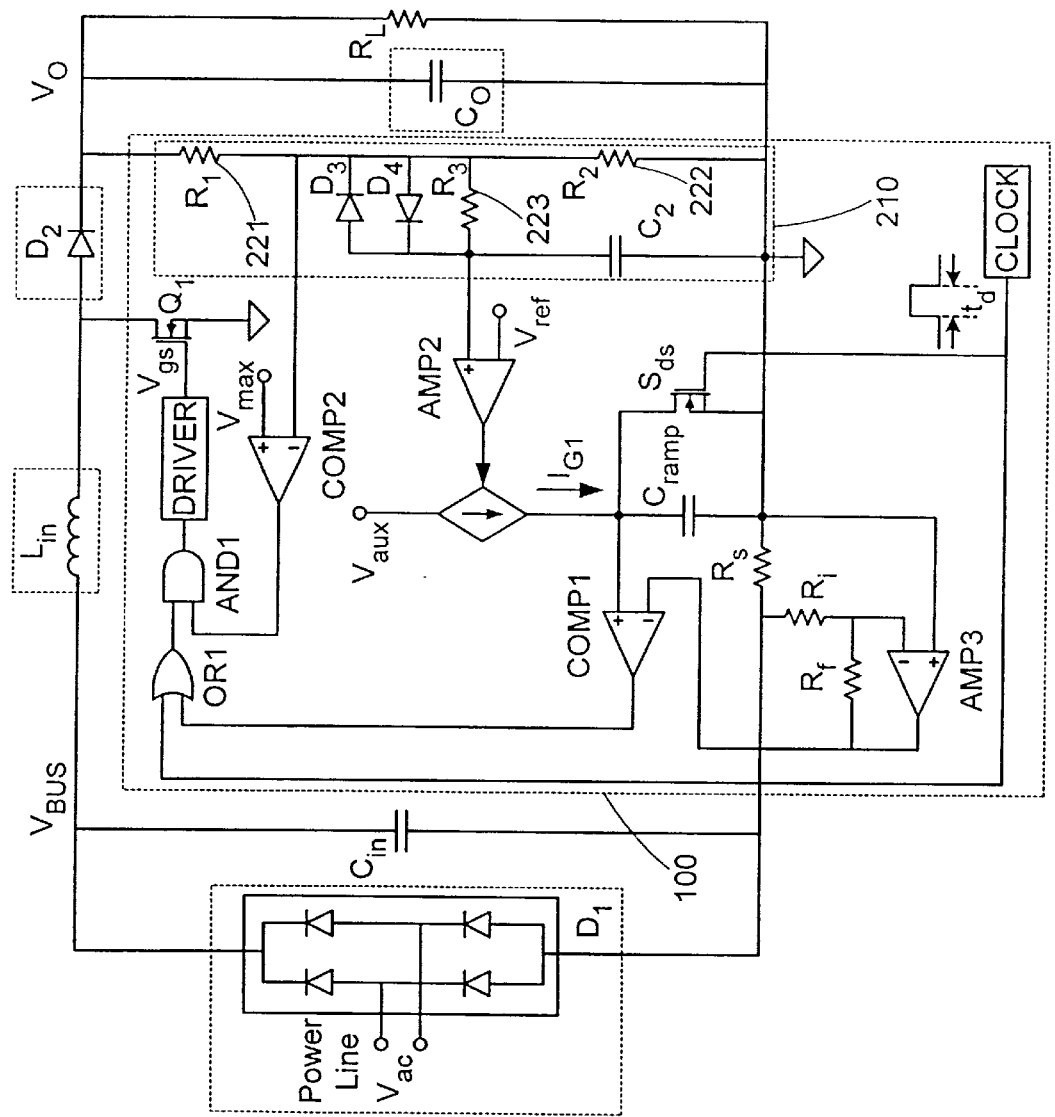
FIG. 7 FIG. 7 illustrates a preferred embodiment of a general control scheme according to the present invention.

Referring now to the drawings, FIG. 7 illustrates a preferred embodiment of a general control scheme according to the present invention. It is built around a Boost stage consisting of an inductor $L_{in}$, a switch module 100 with a main switch $Q_1$ and a ramp capacitor $C_{ramp}$, an output (main) diode $D_2$, and an output capacitor $C_o$. The control, according to eq. (7), is realized by charging capacitor $C_{ramp}$ with a current $I_{G1}$ that is controlled by the amplified difference between the output voltage (after division) and a reference voltage $V_{ref}$. The duty cycle is generated by a first comparator COMP1, which changes state when the ramp voltage across ramp capacitor $C_{ramp}$ is higher than the voltage scaled and amplified across a sense resistor $R_s$ by an amplifier AMP3. In this case $C_{ramp}$ acts as a timing device. The timing device can be either analog, as in this embodiment, or digital, as described below. In contrast with prior art, in this and other embodiments of the control method of the present invention, the duration of the discharge pulse of $C_{ramp}$, $t_d$, is always included as part of the "on time" $t_{on}$ of switch $Q_1$, independent of the amplitude of the input current. This key feature can be accomplished by adding linearization means, for example an element such as a logic gate OR1, to the control scheme. Consequently, $D_{OFF}$ will be linearly proportional to the input current as required by eq.(7), and as can be inferred by examining FIG. 8. (Moreover, $D_{OFF}$ will be smoothly reduced toward zero when the input current goes to zero. Further improvement in the input current THD is obtained by another novel feature of the present invention, a nonlinear feedback from an output circuit 210 in FIG. 7 comprised of resistors $R_1$ (221), $R_2$ (222), and $R_3$ (223), diodes $D_3$ and $D_4$, and a capacitor $C_2$. When the diodes are not conducting, the time constant of a divider comprised of $R_1$ (221), $R_2$ (222), and $R_3$ (223) is chosen to be large in comparison with the ripple component of $V_O$ (whose frequency is twice the line frequency). If however, $V_O$ deviates from the nominal value, the diodes will start conducting, shorting $R_3$ and reducing significantly the time constant of $C_2$ (when the diodes are not conducting the charging time constant is $C_2*(R_3+(R_1*R_2)/(R_1+R_2))$. When at least one of the diodes is conducting (shorting $R_3$) the time constant is $C_2*((R_1*R_2)/(R_1R+R_2))$. Consequently, when the output voltage Vo is within the window determined by the voltage drop of the diodes, the feedback voltage is highly filtered. This attenuates to a large extent the ripple component in the feedback path, thereby lowering the THD of the input current. When Vo deviates from the nominal window, the circuit will react quickly to remedy the situation. Consequently, the voltage excursion from the nominal value, due to load changes, is minimal. Another novel feature of the circuit according to this embodiment of the present invention is the blocking or elimination of the gate pulses of switch $Q_1$ when the $V_O$ reaches a level too high ("extreme level"). This is accomplished by a fast reacting path via a second comparator COMP2 that blocks the gate pulses through a logic gate (connected to $Q_1$ through a driver "DRIVER"), for example an AND1 gate. As those versed in the art will recognize, any other circuitry that can change its output from one predefined state to another when the voltage on its input crosses some pre-designed voltage level can accomplish the same task (interrupt $Q_1$ gate pulses when $V_O$ is fed to the circuitry). It is thus evident that the embodiment of the APFC according to this invention significantly improves the input current THD, while still reacting quickly to changes in the output voltage.

Figure 8:
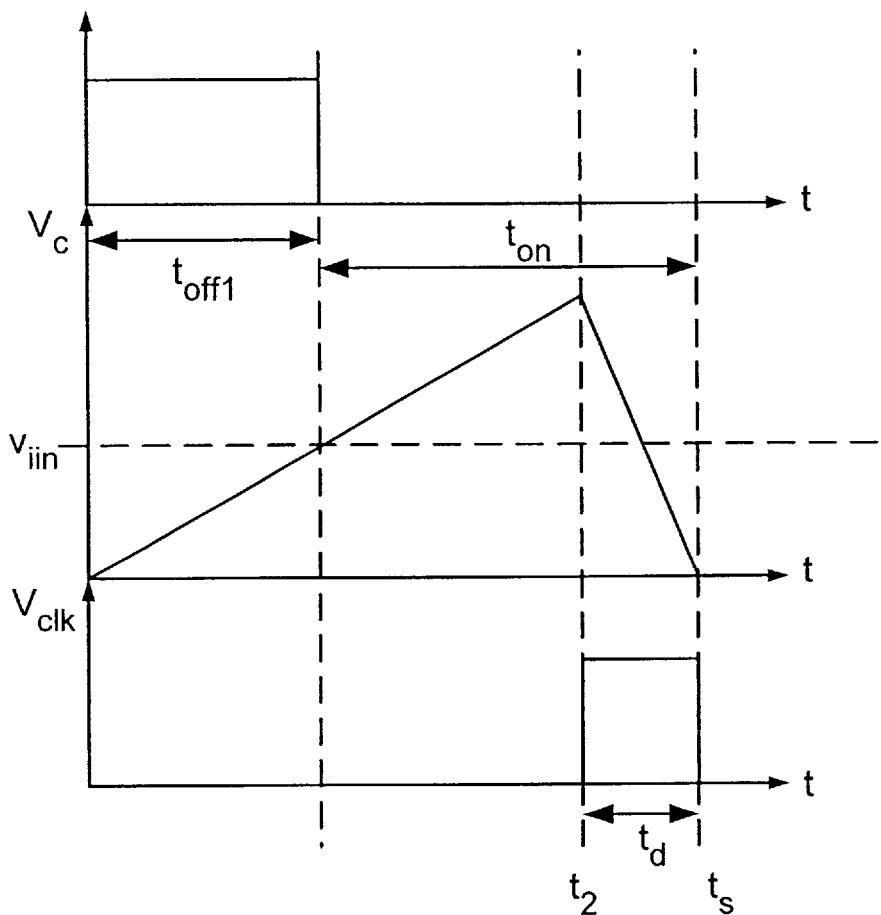
FIG. 8 shows a typical waveform of a variable slope PWM modulator according to the present invention.
Figure 9:
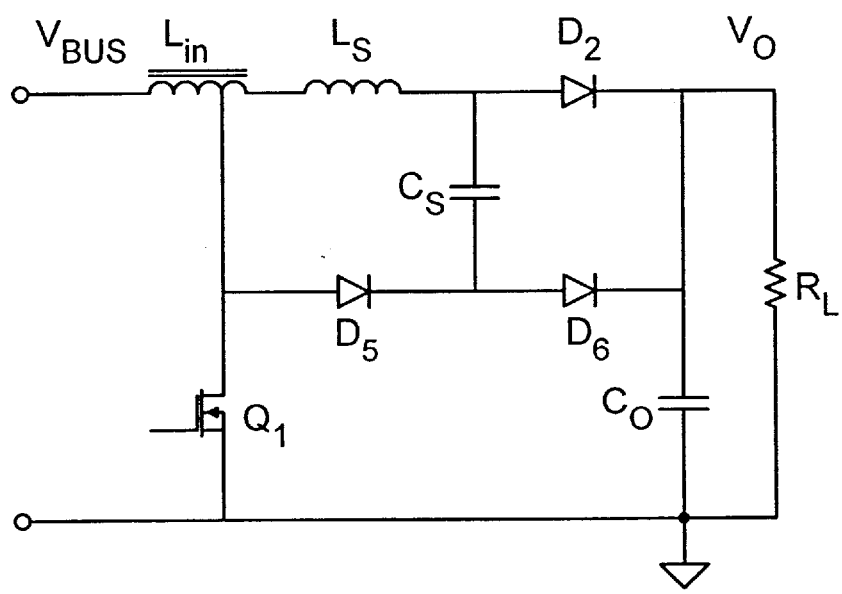
FIG. 9 shows a typical lossless turn-on snubber implemented in a Boost power stage.

An extra benefit of the APFC circuit design of this invention is the fact that the "on time" $t_{on}$ of main switch $Q_1$ is at least $t_d$ (FIG. 8). This is compatible with the requirements of lossless snubbers such as shown in FIG. 9 that reduce significantly the losses of the power stage [H. Levy, I. Zafrany, G. Ivensky, and S. Ben-Yaakov, "Analysis and evaluation of a lossless turn on snubber", IEEE Applied Power Electronics Conference, APEC-97, 757–763, Atlanta, 1997]. Thus, no special preparation (of limiting $t_{on}$ to a minimum value, as explained next) is needed to use such snubbers in our circuit. For proper operation, one has to make sure that the "on time" of the switch will be no less than the time required for the resonant cycle to be completed [H. Levy et al., above] Hence the APFC according to this invention, in conjunction with a lossless snubber such as shown in FIG. 9, will result in an APFC system of very high efficiency and low THD of input current.

As those in the art will recognize, the embodiment of FIG. 7 limits the peak input voltage Vinpk to the value:

$$V_{inpk} = V_o \left(1 - \frac{t_d}{t_s}\right) \qquad (19)$$

Figure 10:
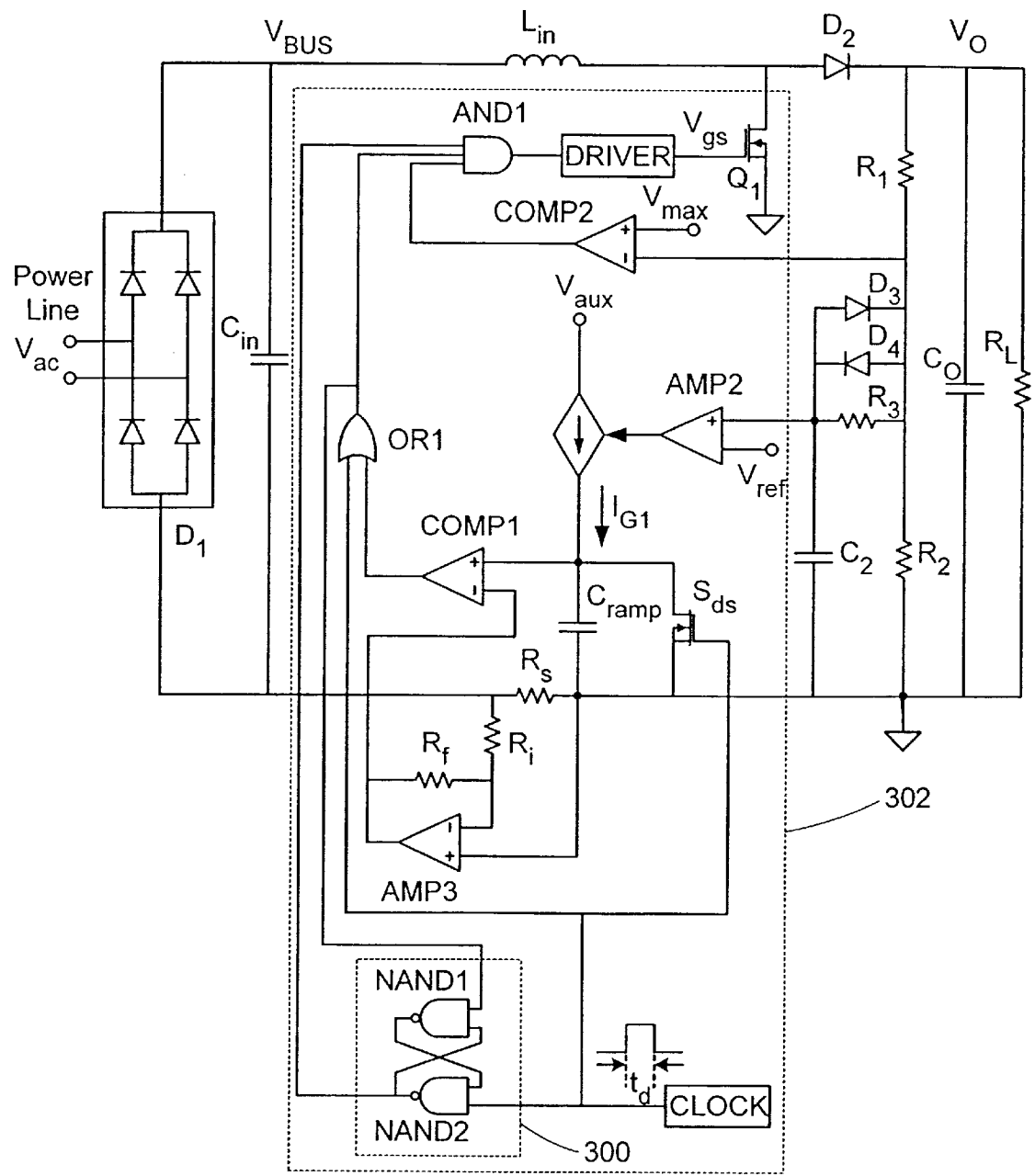
FIG. 10 shows another embodiment of the APFC system of the present invention capable of eliminating short pulses.

This could be a limitation in some applications when the line voltage is high. This difficulty is overcome according to this invention by the alternative embodiment of FIG. 10, for example by using a flip-flop 300 built around a NAND1 and a NAND2 gate, to block or eliminate the $t_d$ pulses if $t_{on} < t_d$. As those skilled in the art will recognize, other circuits may be employed for the same function as flip-flop 300. FIG. 10 also shows a circuitry subsection 302 that can be implemented using either monolithic or hybrid microelectronic technologies.

Figure 1:
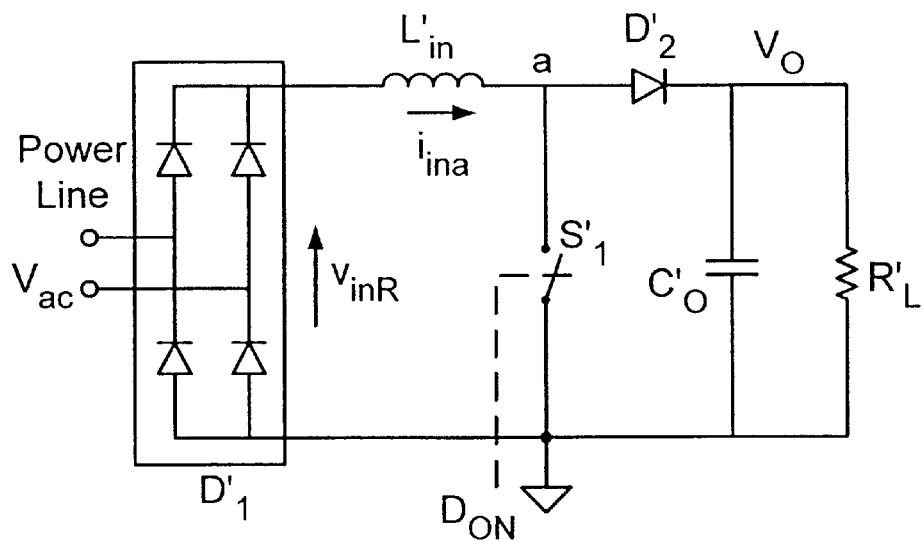
FIG. 1 shows a PWM Boost converter.
Figure 2:
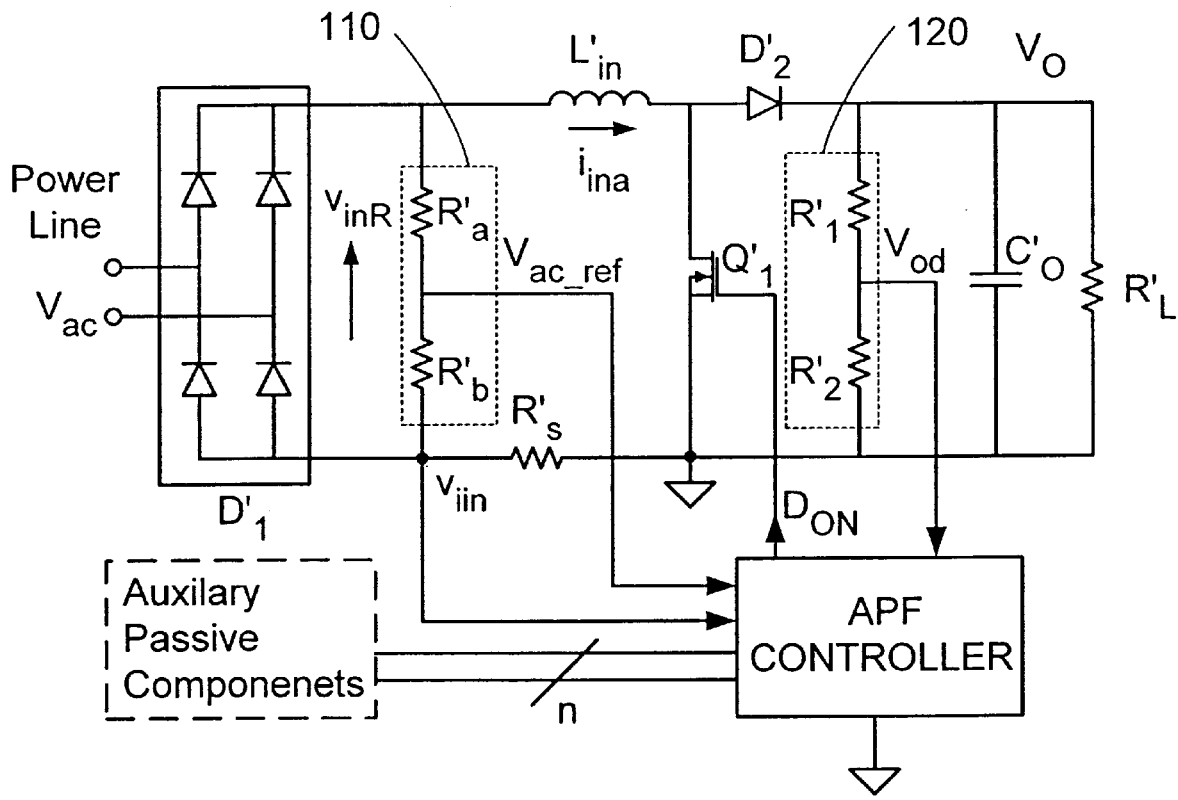
FIG. 2 shows a typical Active Power Factor system.
Figure 3:
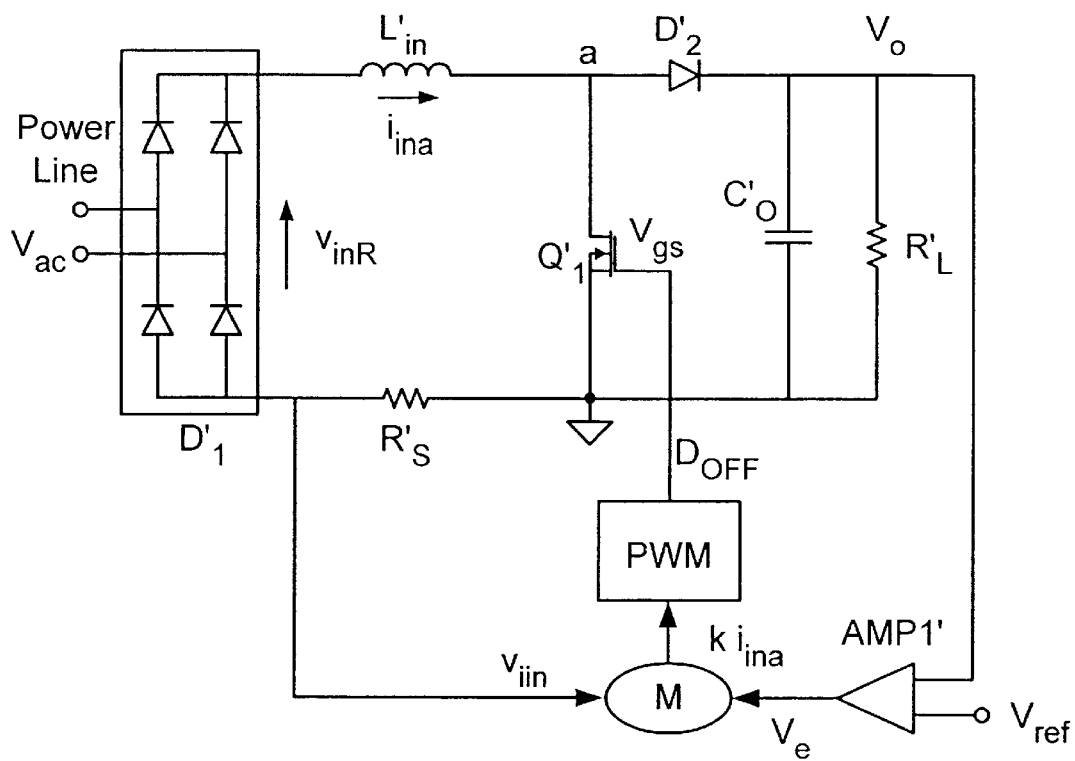
FIG. 3 shows an Active Power Factor control system that does not use sensing of the input voltage.
Figure 4:
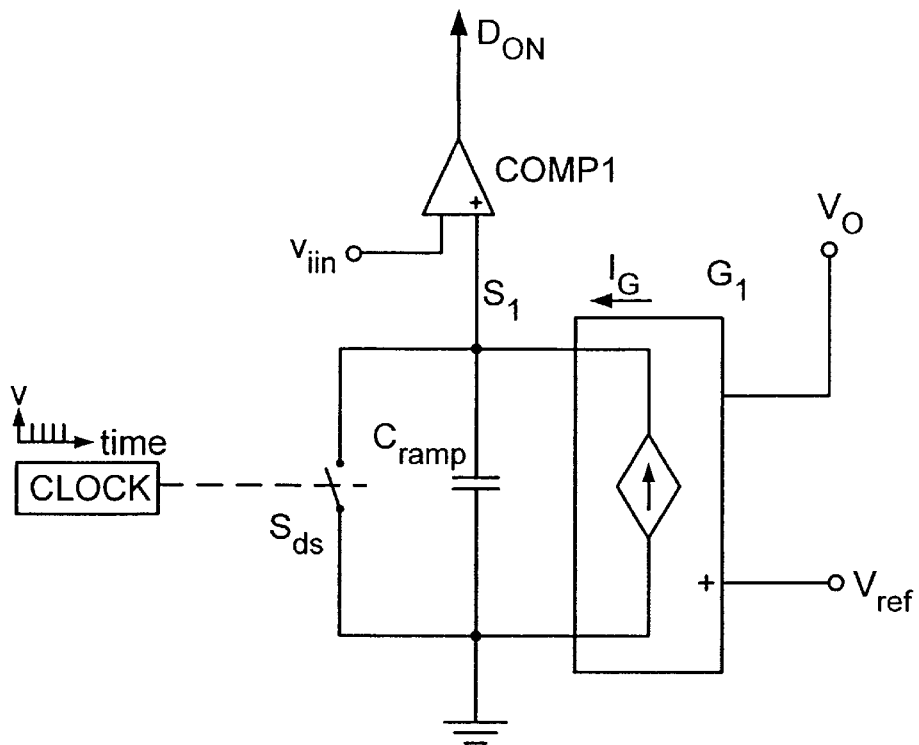
FIG. 4 shows a variable slope PWM modulator.
Figure 5:
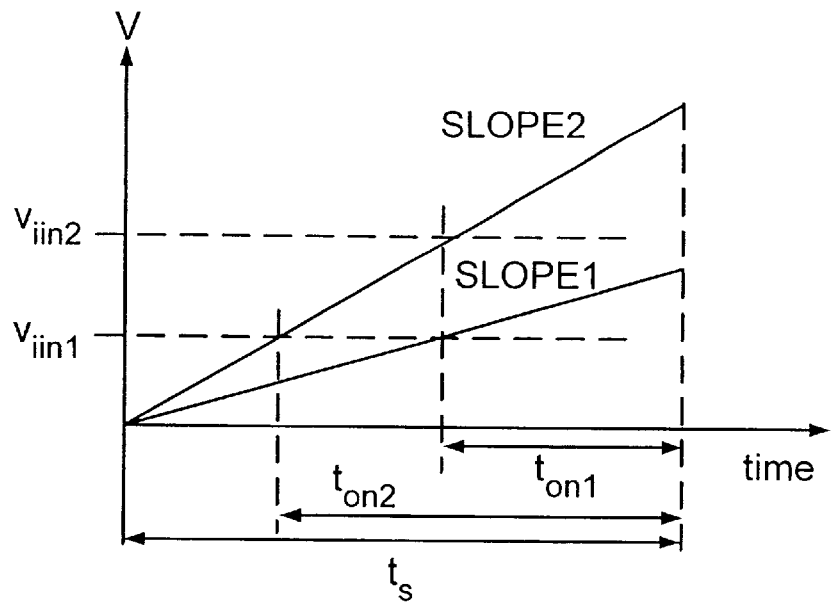
FIG. 5 shows typical graphs of the response of a variable slope PWM modulator to a load change.
Figure 6:
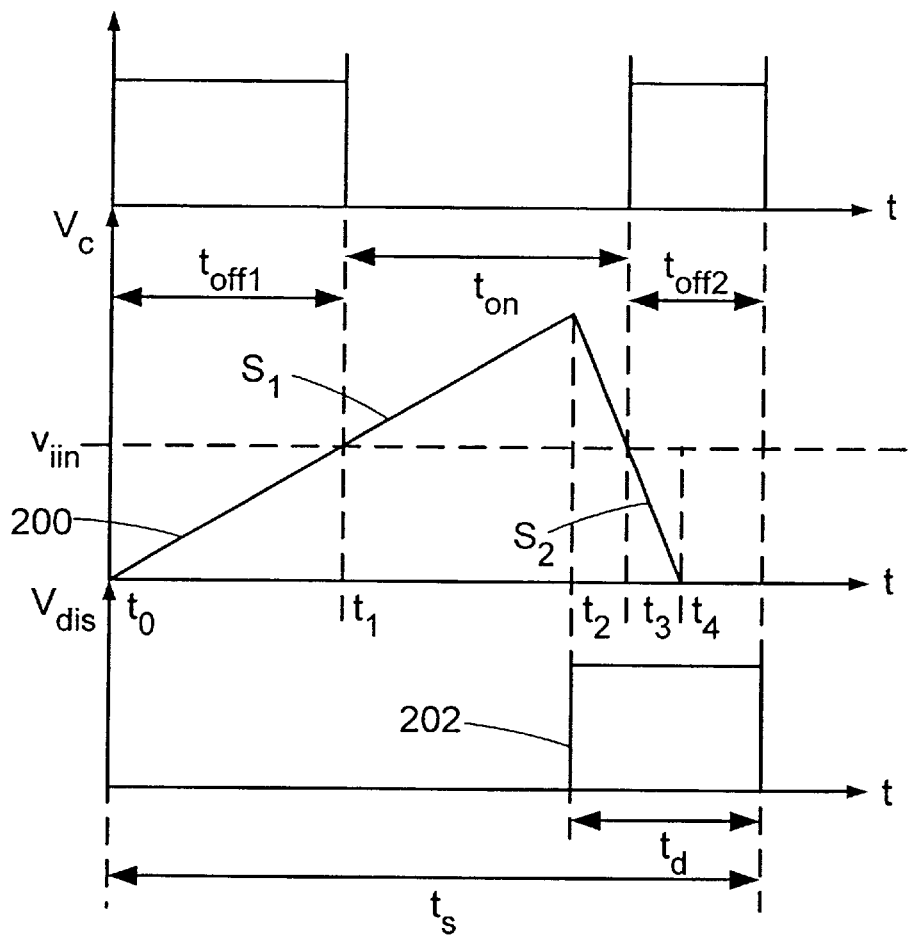
FIG. 6 shows a basic waveform of a variable slope PWM modulator.
Figure 11:
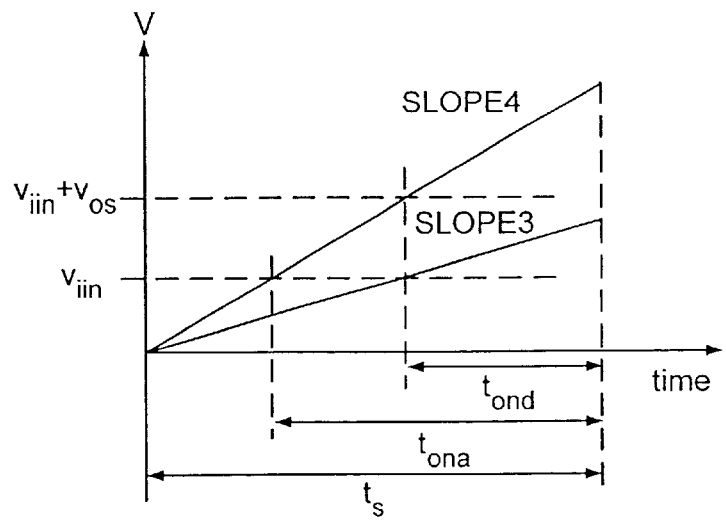
FIG. 11 shows waveforms of a variable slope PWM modulator with an offset.
Figure 12:
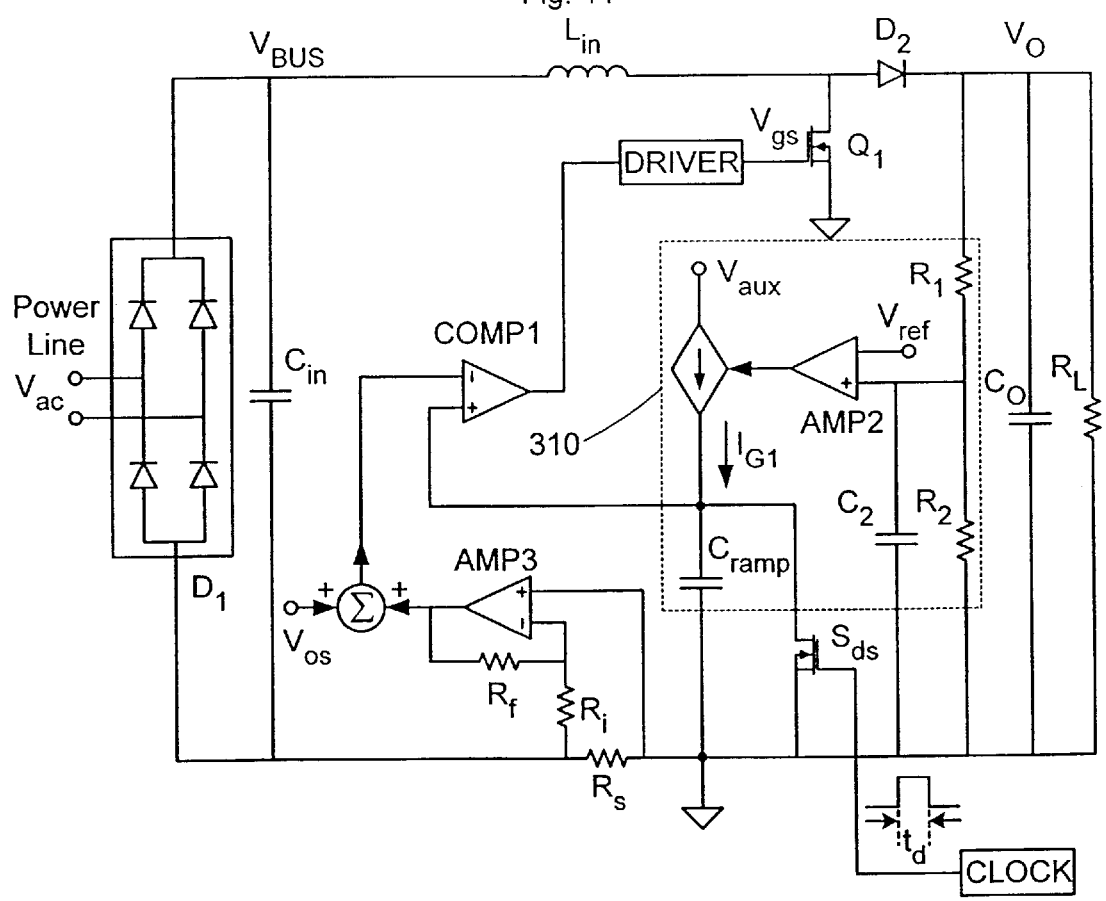
FIG. 12 shows an embodiment of the method with an offset voltage.

The above described operation of an APFC controller according to this invention assumes that the ramp SLOPE can be reduced to close to zero when the input current is small (light load). In practice, due to offsets of amplifiers, leakage current of transistors, etc., SLOPE may lock to a minimum level. Consequently the system will be unable to produce the correct duty cycle as dictated by the output to input voltage ratio (Vo/$v_{inR}$). This is shown schematically in FIG. 1, in which a ramp SLOPE3 is the minimum possible ramp, and $v_{iin}$ is the voltage proportional to the input current (FIG. 4). A resulting non-desired duty cycle $t_{ona}$ might be too large as compared to a desired one $t_{ond}$, and consequently the input current will increase to a too high level. This will increase the output voltage without control to a point that will trip the output voltage protection circuit (normally implemented in practical systems). This problem is solved according to this invention by preferably adding an offset voltage $v_{os}$ to $v_{iin}$ (FIG. 11). An outer feedback path 310 of the system comprised of resistors $R_1$ and $R_2$, capacitors $C_2$ and $C_{ramp}$, amplifier AMP2, and current $I_{G1}$ in FIG. 12) will now produce a ramp SLOPE4 that will generate the required $t_{ond}$. A possible implementation of the refined method is shown in FIG. 12. $v_{os}$ is added to the output of current amplifier AMP3 to increase the voltage level fed to comparator COMP1. The addition of $v_{os}$ may increase the THD of the input current. This addition could be significant at light load. However, line harmonic limitation recommendations and standards such as IEC1000-3-2 exempt equipment from complying with the standard at light loads. Consequently, the added distortion at light load is unimportant. At high loads the increase in THD will be negligible since $v_{iin} \gg v_{os}$. The amount of added offset $v_{os}$ needs thus to be adjusted such that at the minimum power level relevant to the standard, the input current THD level will be acceptable.

Figure 13:
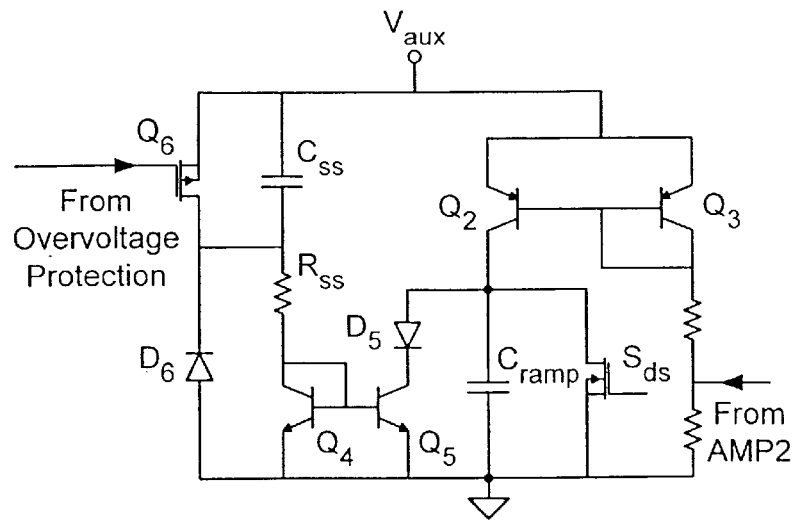
FIG. 13 shows an embodiment of a start-up circuitry.

As known in the art, soft-start circuitry needs to be included in switch mode power systems to avoid the build-up of excessive currents. This might happen at the power-on stage, when the output voltage is considerably below the nominal level, and hence the duty cycle is pushed to maximum value. In this situation, $t_{off}$ will be short, and the power delivered to the output in a boost converter will be small. This will cause a current build-up in the inductor, with a possible catastrophic consequence. To remedy this, one has to limit the duty cycle at power-on stage and whenever the over voltage protection is activated. A possible implementation of the soft-start function according to present invention is shown in FIG. 13. The duty cycle limitation is accomplished by reducing the charging current of capacitor $C_{ramp}$ and hence reducing the ramp SLOPE. The ramp itself is generated by a current mirror (which includes transistors $Q_2$ and $Q_3$) that is controlled by the output of the voltage error amplifier (AMP2 in FIG. 10). Before start-up, a capacitor $C_{ss}$ is discharged (via a diode $D_6$). When an auxiliary voltage source $V_{aux}$ is activated, capacitor $C_{ss}$ is charged exponentially via a resistor $R_{ss}$, and its mirrored current (by transistors $Q_4$, $Q_5$ and a diode $D_5$) reduces the charging current of $C_{ramp}$. This reduced the SLOPE and hence limits $D_{ON}$. As $C_{ss}$ charges, the mirrored current becomes smaller and $C_{ramp}$ is allowed to develop a higher SLOPE. Diode $D_5$ is needed to block a possible parasitic charging path of $C_{ramp}$ base-collector diode of $Q_5$. The soft-start circuit of FIG. 13 also helps the system to smoothly return to normal operation after the over-voltage protection circuitry is tripped. The alarm signal generated by the over-voltage protection module (the signal is assumed to be low when active) will cause a transistor $Q_6$ to conduct and quickly discharge $C_{ss}$. Following this, the soft-start sequence is activated to help the system resume normal operation The implementation of an APFC according to present invention requires the use of a capacitor $C_{ramp}$ that is charged and discharged each switching cycle. The size of the capacitor will be a function of charging current amplitude and the available dynamic range namely, the voltage range that can be handled in a given system. In some cases, the required value of the capacitor may be too large for implementation on chip—when a microelectronics solution is desired. Another practical problem that may deteriorate the performance of an APFC system, built according to this invention, is the interference due to spikes that are typical of a switch mode system. The spikes may cause false trigger of the comparators used in the analog implementation described above.

Figure 14:
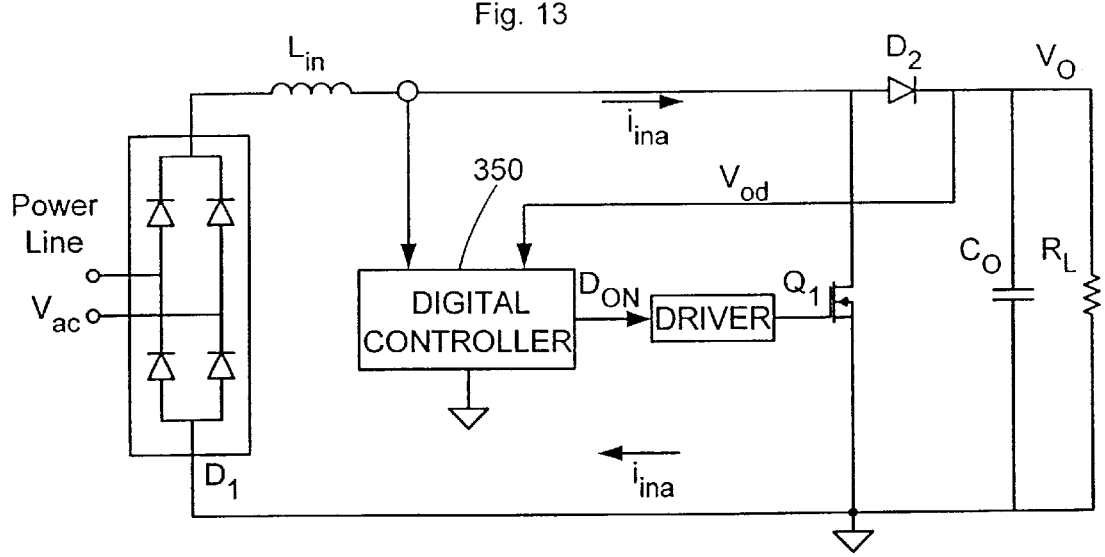
FIG. 14 shows an embodiment of the proposed control method using a digital controller.
Figure 15:
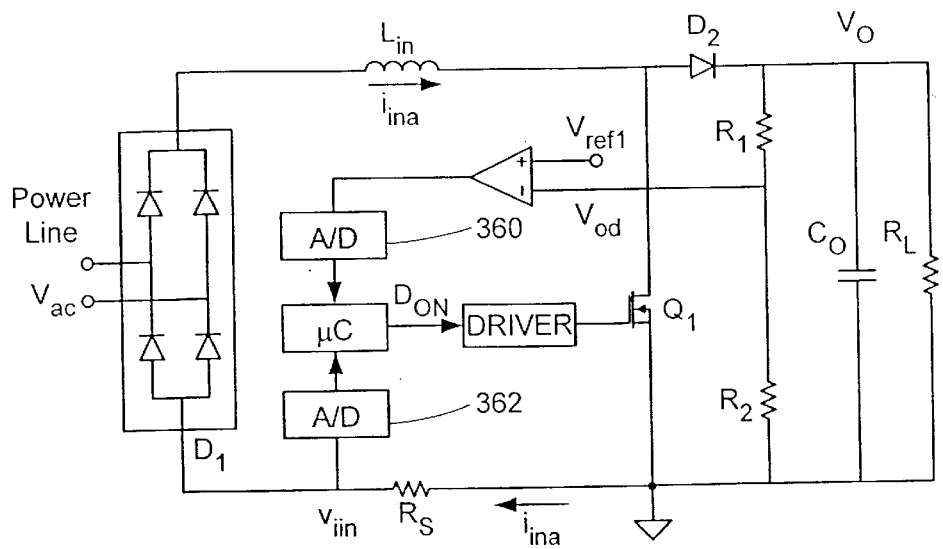
FIG. 15 shows a microcontroller based implementation of the proposed control method.

The two problems (large capacitance for monolithic implementation and false trigger due to interference) can be overcome by modified embodiments of this invention. In particular, one can replace the analog charging and discharging process of the capacitor as well as the analog comparators by a digital circuit, as shown in FIG. 14. A Digital Controller 350 in FIG. 14 receives signals that are proportional to the input current and output voltage and generates the signals that control switch $Q_1$ through driver DRIVER. The algorithm involved is an emulation of the charge comparison scheme described earlier in connection with the analog embodiment. The practical embodiment of the digital approach can, for example, take the form of FIG. 15. In FIG. 15, the digitization is carried out by two analog-to-digital (A/D) converters 360 and 362. A/D 360 digitizes the analog signal from the voltage error amplifier i.e. the difference between an attenuated output voltage (through $R_1$ and $R_2$) $V_{od}$, and reference signal $V_{ref}$, while A/D 362 digitizes the signal that is proportional to the input current, and the algorithm is implemented as a code in a microcontroller $\mu C$.

Figure 16:
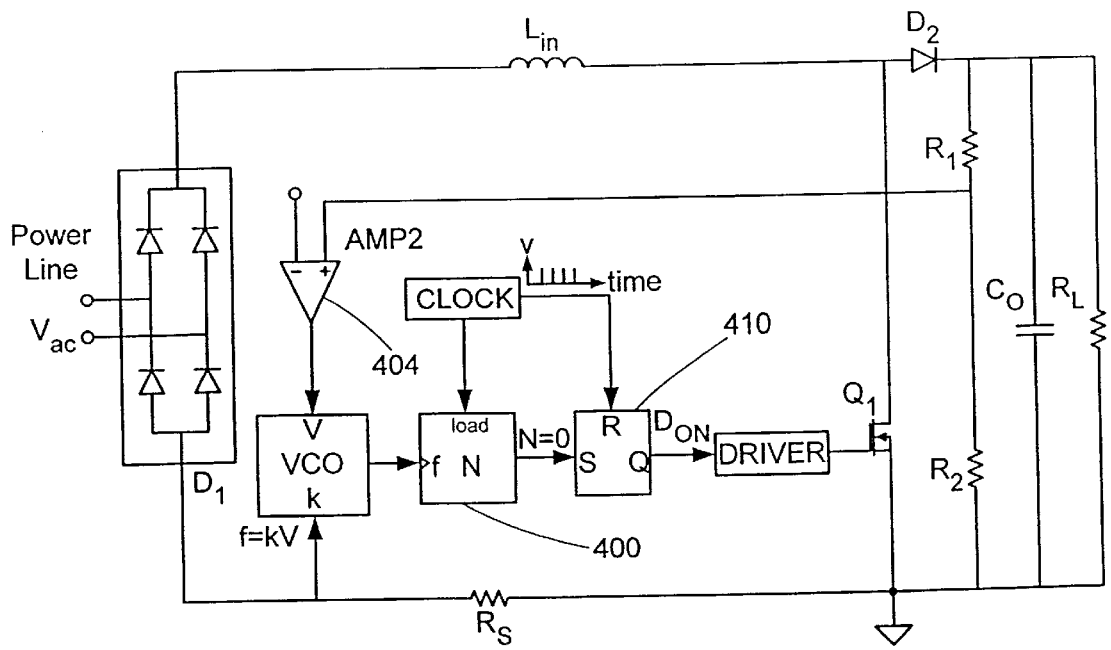
FIG. 16 shows a digital embodiment of the proposed control method.
Figure 17:
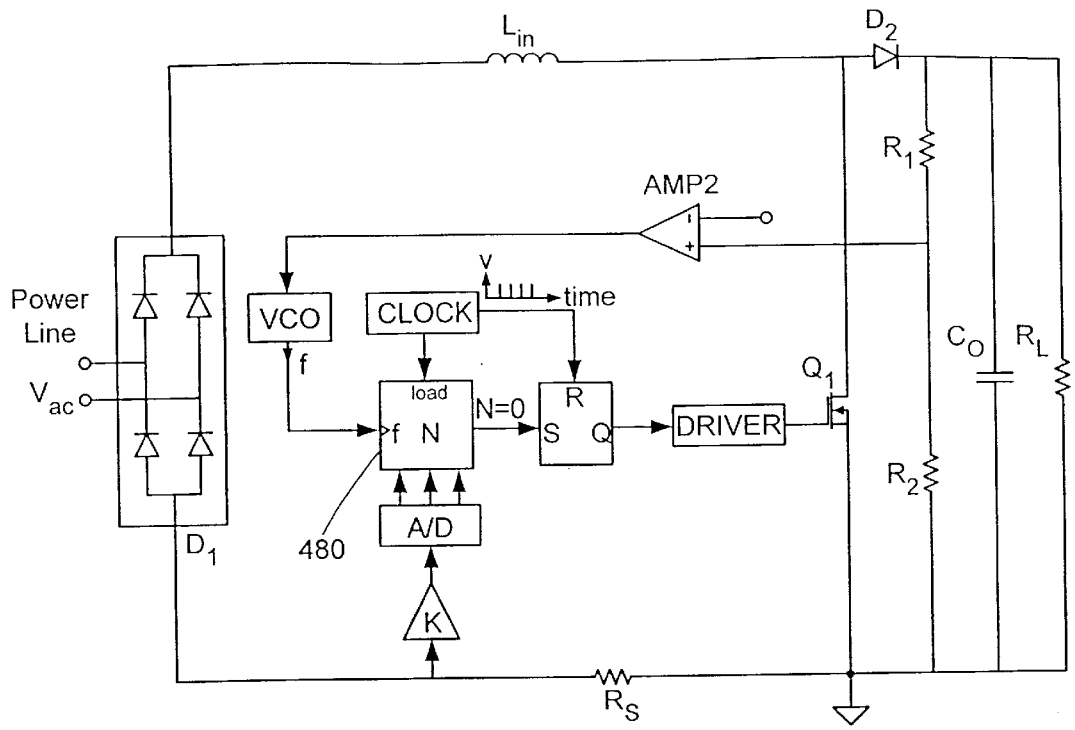
FIG. 17 shows another digital embodiment of the proposed control method.

Another possible digital embodiment is shown in FIG. 16. Here $C_{ramp}$ is replaced by an up or down counter 400 that serves as the (digital) timing device fed by a voltage controller oscillator VCO. The proportional factor (k) of VCO varies with the change of the average input current. This is like changing a negative input of COMP1 (FIG. 7) in the analog case. The input of VCO is driven by an output of a voltage error amplifier AMP2 404. Hence the state of counter 400 is a replica at any given time to the total charge, similar to the case of the capacitor $C_{ramp}$ used in the analog solution. Counter 400 controls an RS flip-flop 410 which in turn drives switch Q1 through driver 420. The proposed embodiment can be implemented also as shown in FIG. 17.

The output frequency of VCO is controlled here by voltage error amplifier 404 only. The voltage signal that is proportional to the average input current is digitized by the A/D converter and loaded to a counter 480. That is, the initial value of counter 480 is proportional to the average input current. The advantages of the digital implementation are that it can be easily and practically built as a microelectronics circuit. Furthermore, since the comparators are digital, they are less prone to false triggering by noise.

Figure 18:
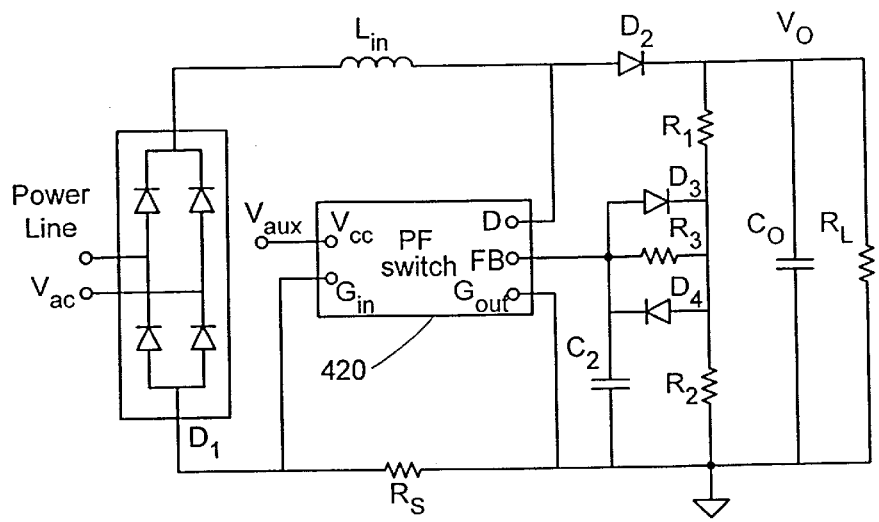
FIG. 18 shows a modular construction of an APFC according to the present invention.

Considering the fact that the APFC built according to this invention does not require the sensing of the input voltage, its construction can be considerably simplified, resulting in a highly flexible and user-friendly structure. This is demonstrated by the embodiment shown in FIG. 18. A PF Switch unit 420 includes all the electronics according to this invention for realizing an APFC system. For low power, unit 420 could be built as an IC chip using conventional microelectronics technology. In general, the electronics in all low-power embodiments of the control apparatus of the present invention, as for example pointed out with regard to subsection 302 in FIG. 10, can be implemented either monolithically or as hybrids in microelectronic circuitry. For higher power, unit 420 can be built as a module using discrete components such as a POWER MOSFET. The power supply required internally can be supplies from outside, or generated inside by a connection to the high voltage available at a pin D. The embodiment of FIG. 18 exemplifies a "modular" embodiment of the apparatus of the present invention

EXAMPLE

Figure 19:
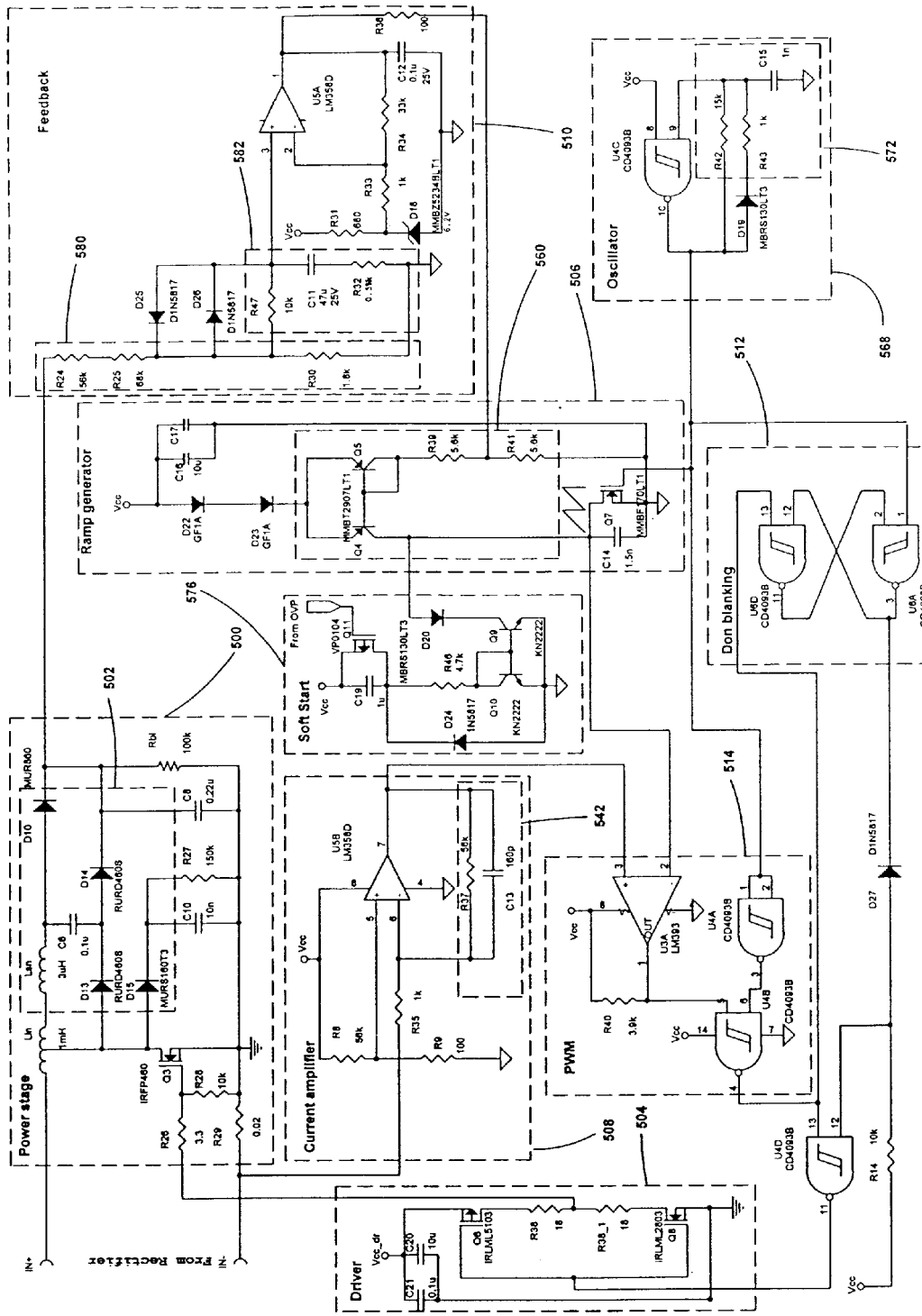
FIG. 19 shows details of a possible embodiment of a circuit implementing the APFC of the present invention.

An example of a preferably practical embodiment of an APFC stage according to this invention is shown in FIG. 19. This circuit diagram consists of a power stage 500 with a snubber, a driver 504, a ramp generator 506, a current amplifier 508, a feedback 510, a $D_{ON}$ blanking 512 and a PWM logic circuitry 514. Power stage 500 (boost topology) includes a main switch $Q_3$, and output diode $D_{10}$, an input inductor $L_{in}$, a current sense resistor $R_{29}$, and a snubber circuitry 528 (comprised of diodes $D_{13}$ and $D_{14}$, a capacitor $C_6$, and an inductor $L_{sn}$). The gate of $Q_3$ is controlled by a driver 504 that is based on two MOSFET transistors $Q_6$ and $Q_8$. The input current of the power stage is sensed by sense resistor $R_{29}$, amplified by a current error amplifier $U_{5B}$ and filtered out by a low pass filter 542 (which includes a resistor $R_{37}$ and a capacitor $C_{13}$). The offset signal needed to handle the low load situation is implemented by a voltage divider (which includes resistors $R_8$ and $R_9$) connected to the positive input terminal of $U_{5B}$. The resulting voltage signal (output of $U_{5B}$) is compared to the output of ramp generator 506 by a voltage comparator $U_{3A}$ to produce a PWM signal for driving main switch $Q_3$. Ramp generator 506 includes a current mirror 560 (comprised of transistors $Q_4$ and $Q_5$, and resistors $R_{39}$ and $R_{41}$), a ramp capacitor $C_{14}$ and a discharging switch $Q_7$ that is controlled by a clock signal. The latter is generated by an oscillator 568 based on a NAND gate with a hysteresis $U_{4C}$ and a RC network 572 (comprised of resistors $R_{42}$ and $R_{43}$, and a capacitor $C_{15}$). The soft start function is realized by a circuit 576 comprised of a capacitor $C_{19}$, diodes $D_{20}$ and $D_{24}$, and transistors $Q_9$ and $Q_{10}$.

The output voltage signal Vo, attenuated by a voltage divider 580 (comprised of resistors $R_{24}$, $R_{25}$, and $R_{30}$) and filtered out by a phase compensator 582 (a capacitor $C_{11}$ and resistors $R_{47}$ and $R_{32}$), is compared to a voltage reference $D_{18}$. The resulting difference is amplified by a voltage error amplifier $U_{5A}$, which adjusts the slope of the ramp voltage (on $C_{14}$) to return $V_o$ back to its predefined value. Two speed up diodes $D_{25}$ and $D_{26}$ act as short circuit when a large change in the output voltage occurs, reducing the cut-off frequency of a phase compensation network 582.

The $D_{ON}$ blanking circuitry blocks the pulses to the gate of main switch $Q_3$ by "pulling down" the input of the NAND gate. That occurs when an extremely small duty cycle is required, because of a very high voltage at the power stage's input.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for reducing the harmonics contents of an input current drawn from a power line into an electrical system without sensing an input voltage, the method comprising:
    a) providing an active power factor correction controller with a switch module having a main switch and a timing device that includes a ramp capacitor, wherein said main switch has an on-time correlated with an on-duty cycle duration, and an off-time correlated with an off-duty cycle duration, wherein said timing device is selected from the group consisting from analog timing devices and digital timing devices,
    b) maintaining a linear relationship between said off-duty cycle duration and the input current by using said timing device, wherein said maintaining includes making said linear relationship dependent on the deviation of an output voltage from a pre-determined reference voltage, and wherein said maintaining step further includes:
        i. charging and discharging said ramp capacitor, said charging associated with a charge time and said discharging associated with a discharge time;
        ii. providing linearization means that include a logic gate added to said controller; and
        iii. using said linearization means to include said discharge time of said ramp capacitor in said on-time of said main switch, and
    c) providing a feedback to said controller using an output circuit referenced to said output voltage.

2. The method of claim 1, further comprising the step of adding an offset to the input current to obtain a combined signal, and making said off-time proportional to said combined signal.

3. The method of claim 1, further comprising adding at least one lossless snubber to said controller, said added at least one lossless snubber increasing the efficiency of said controller in reducing the harmonics content of the input current.

4. The method of claim 1, further comprising blocking the gate pulses of said main switch when said output voltage reaches a level too high.

5. The method of claim 4, wherein said blocking is effected by adding a logic gate to said switch module.

6. The method of claim 4, further comprising the step of eliminating pulses of said discharge time if said on-duty cycle duration is smaller than a predetermined time.

7. The method of claim 1, wherein said step of charging and discharging said capacitor is done with a current controlled by an amplified difference between said output voltage and a reference voltage.

8. An apparatus for active power factor correction with minimum input current distortion, comprising:
 a) an active power factor correction assembly that includes a main switch and a timing device, wherein said main switch has associated therewith an on-time correlated with an on-duty cycle duration, and an off-time correlated with an off-duty cycle duration, and wherein said timing device generates said on-time and off-time and is selected from the group consisting of digital timing devices and analog timing devices, said analog timing devices including a ramp capacitor;
 b) linearization means for maintaining a linear relationship between said off-duty cycle duration and the input current, wherein said linearization means include a logic gate; and
 c) control means for making said linear relationship dependent on the deviation of an output voltage from a pre-determined reference voltage.

9. The apparatus of claim 8, further comprising a non-linear feedback network connected between said timing device and said output voltage to control the level of said output voltage, said non-linear network providing further reduction in the input current distortion.

* * * * *